United States Patent Office 3,527,799
Patented Sept. 8, 1970

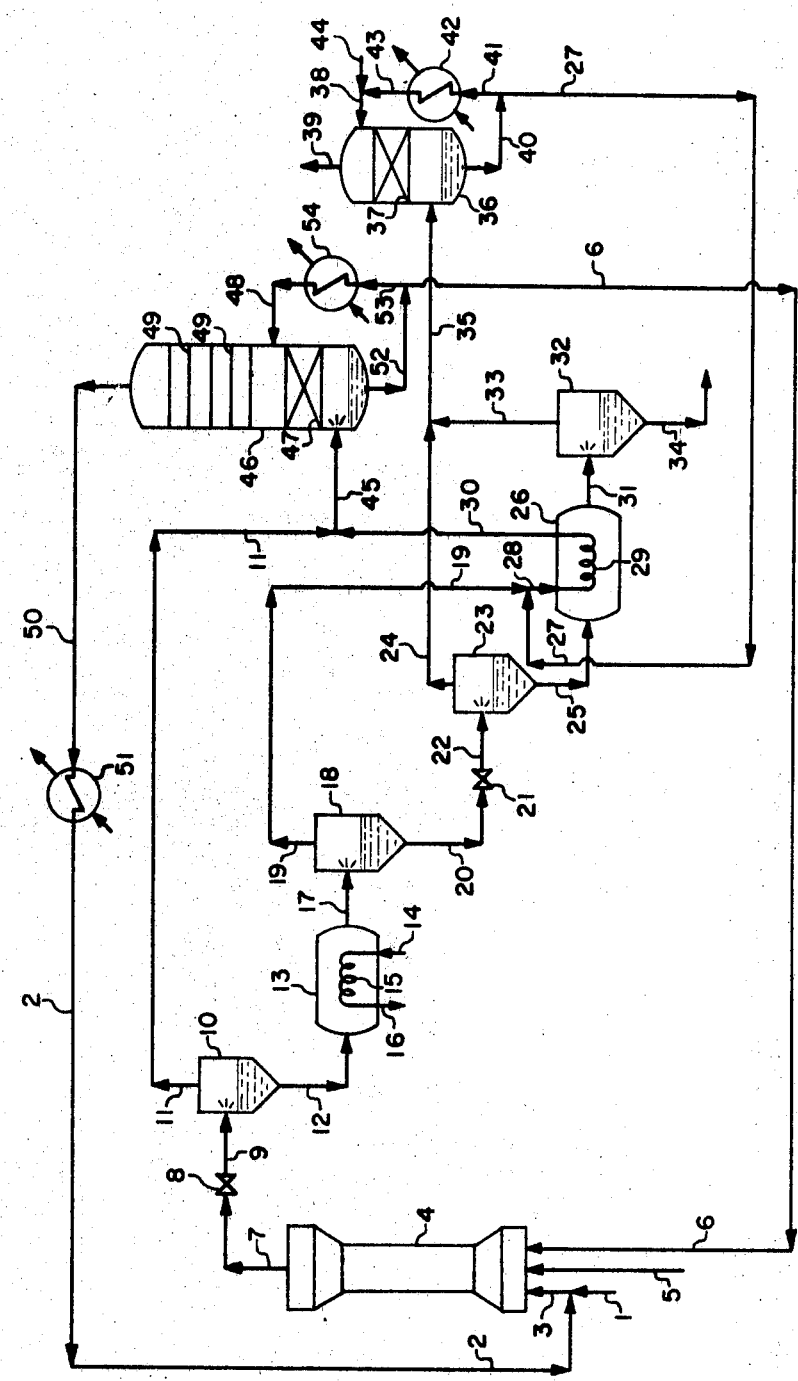

3,527,799
UREA SYNTHESIS PROCESS
Ivo Mavrovic, New York, N.Y., assignor to Chemical Construction Corporation, New York, N.Y., a corporation of Delaware
Filed Jan. 20, 1966, Ser. No. 521,921
Int. Cl. C07c *127/00*
U.S. Cl. 260—555                                3 Claims

ABSTRACT OF THE DISCLOSURE

A urea synthesis process improvement is provided, in which the pressure of the synthesis autoclave effluent stream is adiabatically reduced to produce an off-gas rich in free ammonia, which is separated from the residual liquid stream containing product urea. The residual liquid stream is subjected to two stages of ammonium carbamate decomposition by heating, to produce off-gas streams containing ammonia and carbon dioxide. The first stage off-gas is absorbed in an aqueous absorbent solution while in heat exchange with the residual liquid stream during the second decomposition stage at reduced pressure. Greater heat generation and recovery is obtained by separating the initial ammonia-rich off-gas generated by pressure reduction from the liquid effluent stream, and only passing the first decomposition stage off-gas to the heat recovery sequence.

---

The present invention relates to the synthesis of urea by the reaction between ammonia and carbon dioxide at elevated pressure. An improved sequence for heat recovery is presented, in which ammonium carbamate in the synthesis effluent stream is decomposed in two stages at successively reduced pressure and the requisite heat for second stage decomposition is obtained in a heat exchange zone by a re-absorption of off-gases from the first stage decomposition in an aqueous absorbent solution. The off-gases from the first stage decomposition of ammonium carbamate in the present invention are of reduced excess ammonia content, and consequently greater heat recovery at a higher temperature level is attained.

The synthesis of urea is accomplished by the reaction between ammonia and carbon dioxide at elevated pressure and temperature. Under synthesis conditions, these reactants immediately combine to form ammonium carbamate. This intermediate compound then splits off one molecule of water to yield urea. This dehydration reaction is slow and does not go to completion in commercial practice. In most instances, excess ammonia is provided to exert a dehydration effect and obtain higher yields of urea. The synthesis effluent stream derived from the high pressure synthesis reaction thus contains urea, water, ammonium carbamate and excess ammonia. In current practice, this process stream is heated in two stages at successively reduced pressure levels to decompose the ammonium carbamate and generate off-gas streams containing ammonia, carbon dioxide and water vapor, which are separated from the residual liquid phase. The final residual liquid phase from the second decomposition stage, consisting of product aqueous urea solution containing only very minor amounts of dissolved ammonia and carbon dioxide, may then be processed in any suitable manner such as evaporation followed by crystallization or prilling, to yield solid urea product. The off-gases may be utilized for the production of other fertilizers such as ammonium nitrate or ammonium sulfate, by reaction with nitric acid or sulfuric acid, however, it is usually more desirable to recycle the off-gas to the urea synthesis process for further production of urea, thus providing a complete recycle process. The recycle of off-gases may be accomplished in several ways, such as by partial condensation of the off-gases to form an aqueous ammonium carbamate recycle solution while producing residual off-gas streams consisting of ammonia free of carbon dioxide. Processes of this nature are described in U.S. Pats. Nos. 3,155,722 and 3,193,353.

An important development in the urea synthesis art relative to heat conservation and useful heat recovery consists of absorbing the off-gases generated from the first stage of ammonium carbamate decomposition in an aqueous absorbent solution, while in a heat exchange zone and in heat exchange with the residual liquid stream during second stage ammonium carbamate decomposition. In this process sequence, the absorption of first stage off-gas serves to generate heat, principally from the heat of formation of ammonium carbamate in the liquid phase, as the first stage off-gas is reabsorbed into the liquid aqueous absorbent solution. This basic procedure is described in U.S. Pats. Nos. 3,137,725; 3,147,304; 3,155,722; 3,155,723 and U.S. patent application No. 84,192 filed Jan. 23, 1961 and now issued as U.S. Pat. No. 3,258,486.

In all of these prior art references, the basic sequence consists of reducing the pressure of the urea synthesis effluent stream by passing the effluent stream through a reducing valve, and then passing the entire effluent stream to the first stage decomposer in which the entire process stream is heated. Thus, a single first stage off-gas is removed from the effluent stream after the heating step, and the entire first stage off-gas is subsequently contacted with an aqueous absorbent solution in the heat exchange zone and while in heat exchange with the residual liquid process stream.

In the present invention, the pressure of the synthesis effluent stream is initially reduced under substantially adiabatic conditions, which results in the formation of an initial gaseous phase which principally consists of ammonia, derived from the excess ammonia present in the effluent stream. The initial gaseous phase will also usually contain a small amount of carbon dioxide, derived from ammonium carbamate decomposition. This initial gaseous phase is separated from the residual liquid phase, which is then heated to generate an off-gas of relatively lower ammonia content and principally derived from ammonium carbamate decomposition. This off-gas is then separated from the residual liquid phase, and is utilized as the reactant gas stream which is contacted with an aqueous absorbent solution in heat recovery sequence discussed supra, in order to provide heat for decomposition of residual ammonium carbamate in the residual liquid phase at a further reduced pressure level.

It has been found that this process sequence is highly beneficial and advantageous, in producing substantially improved heat recovery conditions. The improvement is attained because the initial gaseous phase derived from adiabatic pressure reduction consists mostly of ammonia. In the prior art technique, this initially formed gaseous phase was a component of the off-gas stream derived from heating of the effluent stream, and the total first stage off-gas stream passed to the heat recovery step was of relatively high ammonia content. The presence of the excess ammonia thus served to dilute the first stage off-gas derived from heating of the liquid stream.

In the present invention, because the initial gaseous phase derived from the synthesis effluent stream by adiabatic pressure reduction and high in ammonia content is separated from the liquid phase and the liquid phase is subsequently heated to generate a first stage off-gas which is utilized in the heat recovery procedure, the first stage off-gas of the present invention is considerably lower in free ammonia content than in the prior art procedures. As a result, because the first stage off-gas of the present invention does not contain a large proportion of excess free ammonia, the partial pressure of carbon dioxide in the first stage off-gas is increased compared to the prior art procedure. Consequently, the ammonium carbamate condensation temperature at any particular pressure is raised to a higher level, and therefore the amount of heat recovery and also the temperature level at which heat is available are increased in the present invention, compared to the prior art procedure. This result is attained because, for any particular pressure and temperature, an increase in the proportion of excess ammonia will result in a reduction in the proportion of ammonium carbamate condensing into the liquid phase.

The importance of this distinction of the present invention is evidence by the fact that in the prior art sequence, such as disclosed in the patents cited supra and U.S. Pat. 3,090,811, due to the presence of a large excess of ammonia in the off-gas being passed to the heat recovery sequence, a much smaller proportion of ammonium carbamate is condensed into the liquid phase, together with a slightly greater proportion of free ammonia. However, the heat of condensation from gas to liquid of free ammonia is only about 12,000 B.t.u./lb. mol, while the heat of condensation and formation of ammonium carbamate in the liquid phase from gaseous ammonia and carbon dioxide is much larger, and is on the order of 68,000 B.t.u./lb. mol. Thus, the procedure of the present invention provides greater heat recovery at a higher temperature level, and consequently more complete decomposition of residual ammonium carbamate is attained in the second stage decomposer and less heat transfer surface is required, and therefore the second stage decomposer in the present invention is a smaller and less costly apparatus unit.

The broad concept of separating an initial gaseous phase from the urea synthesis effluent by adiabatic pressure reduction, followed by first stage heated decomposition of ammonium carbamate and generation of a first stage off-gas, is part of the process sequence of U.S. Pat. No. 3,172,911. However, the process sequence of this patent also entails the immediate combination of the initial gaseous phase with the first stage off-gas, so as to produce a combined gas stream of reduced water content, and also entails the subsequent processing of the combined gas stream as a single unit gas stream, and consequently the advantages of the present invention derived from separate processing of the two gas streams are not comprehended in this patent, specifically with respect to heat recovery by re-absorption of off-gas in an aqueous absorbent solution while in heat exchange with the liquid process stream during second stage ammonium carbamate decomposition.

It is an object of the present invention to produce urea in an improved and more efficient manner.

Another object is to provide an improved heat recovery sequence in urea synthesis, in which off-gas is absorbed in an aqueous absorbent solution while in a heat exchange zone.

A further object is to provide a heat recovery sequence in urea sythesis in which greater heat recovery is attained at a higher temperature level.

An additional object is to provide a more effective and reactive off-gas for contact with an aqueous absorbent solution in the heat exchange zone of a heat recovery sequence in urea synthesis.

Still another object is to provide an off-gas of reduced free ammonia content for contact with an aqueous absorbent solution in the heat exchange zone of a heat recovery sequence in urea synthesis.

Still a further object is to produce higher condensation of ammonium carbamate from off-gas, when off-gas is contacted with an aqueous absorbent solution in the heat exchange zone of a heat recovery sequence in urea synthesis.

An object is to provide an improved sequence for generating a first stage ammonium cabamate decomposer off-gas for utilization in a heat recovery sequence in urea synthesis, in which the off-gas is absorbed in an aqueous aborbent solution while in a heat exchange zone and in heat exchange with liquid process stream in a second stage ammonium carbamate decomposer.

An object is to provide a heat recovery sequence in urea synthesis by absorption of off-gas in an aqueous absorbent solution while in heat exchange in a second stage ammonium carbamate decomposer, in which the second stage decomposer is of reduced size and cost.

These and other objects and advantages of the present invention will become evident from the description which follows. Referring to the figure, in which a preferred embodiment of the invention is presented, liquid ammonia feed stream 1 is combined with recycle liquid ammonia stream 2, and the resulting combined liquid ammonia stream 3 is passed into urea synthesis autoclave 4, together with carbon dioxide feed stream 55 and recycle aqueous ammonium carbamate solution 6. Streams 3 and 5 react within vessel 4 to form further ammonium carbamate, and under the urea synthesis conditions maintained in vessel 4, including an excess proportion of free ammonia, a major portion of the ammonium carbamate dehydrates to yield urea. The reacting streams within vessel 4 will typically be maintained at a pressure in the range of 140 kg./sq.cm. to 420 kg./sq.cm. and a temperature of 150° C. to 230° C.

The resulting synthesis effluent stream 7 discharged from vessel 4 at elevated pressure contains urea, ammonium carbamate, excess free ammonia and water. Stream 7 is passed through pressure-reducing valve 8. The resulting stream 9, now at a pressure typically in the range of 14 kg./sq. cm. to 30 kg./sq. cm. and containing an initial gaseous phase spontaneously evolved under adiabatic conditions due to pressure reduction, is discharged into gas-liquid separator 10, which is a cyclonic or baffled vessel of conventional design for the separation of gas and liquid phases. Due to the cooling effect resulting from adiabatic evolution of a gaseous phase, a reduced temperature typically in the range of 100° C. to 150° C. will be maintained in vessel 10. The gaseous phase separated in vessel 10 is removed via stream 11, and is preferably passed to subsequent processing as described infra for recycle to urea synthesis. As discussed supra, stream 11 consists mostly of ammonia and contains a major portion of the excess free ammonia originally present in stream 7. In typical operation, stream 11 will usually contain about 90% ammonia by volume, together with minor amounts of carbon dioxide and water vapor.

The residual liquid process stream 12 is withdrawn from vessel 10 and is passed into first stage decomposer vessel 13, in which a portion of the ammonium carbamate in the liquid phase is decomposed to gaseous ammonia and carbon dioxide by heating the liquid stream, at a temperature typically in the range of 120° C. to 180° C. A heating fluid stream 14, usually consisting of steam, is passed into heating coil 15 within vessel 13, and the resulting cooled fluid, usually consisting of condensate water, is removed from coil 15 via stream 16. The resulting process stream 17 discharged from vessel 13 is passed into gas-liquid separator vessel 18, which is a unit similar in configuration and function to vessel 10 described supra. First stage off-gas stream 19 is removed from vessel 18, and is passed to a heat recovery sequence as described infra. Stream 19 principally contains ammonia and carbon dioxide derived from decomposition of ammonium carbamate and does not contain a large excess proportion of ammonia relative to carbon dioxide, due to the prior separation of stream 11 as described supra.

The residual liquid process stream 20 is withdrawn from vessel 18 and is passed through pressure reducing valve 21. The resulting stream 22, now at a pressure typically in the range of 1.4 kg./sq. cm. to 4.5 kg./sq. cm. and containing a gaseous phase spontaneously evolved under adiabatic conditions due to pressure reduction, is preferably discharged into gas-liquid separator 23 for separation of the initially formed gaseous phase prior to second stage heated decomposition. Vessel 23 is a unit similar in configuration and function to vessel 10 described supra, and a temperature typically in the range of 90° C. to 130° C. is maintained in vessel 23. The gaseous phase separated in vessel 23 is removed via stream 24, and is preferably passed to processing as described infra for recycle to urea synthesis.

The residual liquid process stream 25 is withdrawn from vessel 23 and is passed into second stage decomposer vessel 26, in which substantially all of the residual ammonium carbamate in the liquid phase is decomposed to gaseous ammonia and carbon dioxide by heating the liquid stream at a temperature typically in the range of 100° C. to 150° C. and by heat exchange in accordance with the heat recovery sequence involving contact of first stage off-gas with aqueous absorbent solution. In accordance with this sequence, first stage off-gas stream 19 is mixed with aqueous absorbent solution 27, which in this preferred embodiment of the invention consists of aqueous ammonia-ammonium carbamate solution derived in a manner to be described infra. The mixed gas-liquid stream 28 passes into heating coil 29 within vessel 26, and absorption of at least a portion of the gaseous phase into the liquid phase takes place in coil 29 with consequent formation of ammonium carbamate and generation of heat, which is absorbed by the liquid process stream in vessel 26.

The resulting stream 30 of reduced heat content is withdrawn from coil 29, and is preferably recycled to urea synthesis as described infra. The process stream 31 discharged from vessel 26 is passed into gas-liquid separator vessel 32, which is a unit similar in configuration and function to vessel 10 described supra. Second stage off-gas stream 33 is removed from vessel 32, and is preferably recycled to urea synthesis as described infra. The residual liquid process stream 34 withdrawn from vessel 32 now consists of product aqueous urea solution containing only very minor residual amounts of ammonia and carbon dioxide. Stream 34 may be suitably further processed by conventional means not shown, such as evaporative concentration and crystallization or prilling, in order to produce a solid urea.

Returning to separator 32, off-gas stream 33 is combined with gaseous stream 24, and the combined gaseous stream 35 is passed into gas scrubber 36 below section 37, which consists of suitable conventional means for gas-liquid contact such as packing or bubble cap trays. The rising gas phase in vessel 36 flows upwards through section 37, and is scrubbed by downflowing aqueous liquid admitted into vessel 36 above section 37 via stream 38. The ammonia and carbon dioxide contained in the rising gas phase are absorbed into the liquid phase in section 37, and the residual gas phase consisting principally of inerts is discharged to atmosphere via stream 39. Scrubbing liquid is removed from the bottom of vessel 36 via stream 40, which is divided into streams 27 and 41. Stream 27 is recycled to the heat recovery sequence as described supra, while stream 41 is cooled in cooler 42, and the resulting cooled absorbent solution stream 43 is combined with make-up aqueous solution stream 44 to form stream 38.

Returning to decomposer vessel 26, process stream 30 discharged from coil 29 is combined with gaseous stream 11, and the resulting combined stream 45 is passed into condenser-stripper vessel 46 below packed section 47. Unit 46 serves to separate stream 45 into a pure ammonia gas stream and aqueous ammonium carbamate solution, which are subsequently recycled to urea synthesis, and unit 46 is of a configuration and function similar to units described in U.S. Pats. No. 3,155,722; 3,155,723; and 3,191,916. Stream 45 separates into gaseous and liquid portions in the lower part of unit 46, and the gaseous portion rises through packed section 47 and is scrubbed with cold aqueous ammonia-ammonium carbamate solution stream 48, which is admitted into unit 46 above section 47 and flows downwards through section 47. Condensation of carbon dioxide into the liquid phase as ammonium carbamate takes place in section 47, and the rising residual gaseous phase of depleted carbon dioxide content passes through upper gas reflux section 49, which is provided with bubble cap trays and suitable cooling means, not shown. The gas stream is further cooled and refluxed in section 49, and the balance of the residual carbon dioxide is condensed into the liquid phase which flows downward to join stream 48. The residual gas phase above section 49, now consisting of ammonia substantially free of carbon dioxide, is withdrawn as stream 50, condensed to liquid ammonia in cooler 51, and recycled to urea synthesis as stream 2.

Returning to unit 46, the liquid solution stream 52 is withdrawn below section 47, and is divided into streams 6 and 53. Stream 6 is recycled to urea synthesis as described supra, and stream 53 is cooled in cooler 54 and recycled to unit 46 as stream 48.

Numerous alternatives within the scope of the present invention will occur to those skilled in the art. Thus, the ranges of process variables such as temperature and pressure enumerated supra constitute merely preferable ranges of these variables for optimum utilization of the process concepts of the present invention, and thus it will be evident that the process is operable under process conditions of temperature and pressure other than those enumerated supra. The process concept of the present invention is applicable to any urea synthesis process in which ammonium carbamate decomposition is carried out in a plurality of stages at successively reduced pressure, and decomposition in lower pressure stages is attained by means of the heat recovery sequence involving reabsorption of off-gas in aqueous absorbent solution while in a decomposer heat exchange zone as described supra.

The process sequence of the present invention has been described supra with respect to a complete recycle procedure, in which unconverted process components are recycled to urea synthesis. It is evident that the process sequence of the invention is also applicable in instances where streams 6 or 2 are omitted, and any or all of the process streams 11, 30, 24 and 33 are passed to auxiliary facilities for the recovery of ammonia values, such as in the form of ammonium nitrate or ammonium sulfate by reaction with nitric acid or sulfuric acid. It is also within the scope of the present invention to recycle only stream 45 to urea synthesis as described supra, while passing stream 35 to auxiliary facilities, not shown, for the recovery of ammonia values. It is also evident that streams 11, 30, 24 and 33 may be recycled to urea synthesis by other means known to the art, such as by separation of ammonia from carbon dioxide by employing a selective solvent for one component such as ethanolamine, followed by separate recycle of the individual ammonia and carbon dioxide streams. In instances where stream 35 is not recycled to urea synthesis as described supra and stream 27 is not produced for contact with stream 19 in the heat recovery sequence, alternative aqueous absorbent solutions such as water, aqua ammonia or aqueous urea solution may be employed instead of stream 27 in the heat recovery sequence. Stream 44 may consist of water, aqueous ammonia solution, or aqueous urea solution. Stream 44 may consist of a small portion of stream 34. Vessel 23 and its function may be omitted in some instances, in which case stream 22 will be passed directly into unit 26 and stream 24 will be evolved in unit 32 as a component of stream 33. This latter alternative is relatively less desirable, due to adverse water balance considerations as discussed in U.S. Pat. No. 3,172,911.

An example of an application of the process concept of the present invention will now be described.

EXAMPLE

The process concept of the present invention was applied to the design of an industrial urea synthesis facility, and the total heat recovery, temperature level generated, and process stream compositions were determined and compared to a procedure in which both streams 11 and 19 were passed to the heat recovery sequence. Following are comparative data tables for both procedures.

TABLE I.—HEAT RECOVERY WITH PRIOR ADIABATIC SEPARATION OF EXCESS AMMONIA

| Stream No. | Stream composition, kg./hr. | | | | Temp., °C. | Pressure, kg./sq. cm. |
|---|---|---|---|---|---|---|
| | Urea | Carbon dioxide | Ammonia | Water | | |
| 25 | 6,400 | 320 | 800 | 3,200 | 100 | 2.1 |
| 34 | 6,400 | 22 | 40 | 2,140 | 124 | 2.1 |
| 33 | | 298 | 760 | 1,060 | 124 | 2.1 |
| 19 | | 1,530 | 2,344 | 1,090 | 150 | 18.6 |
| 27 | | 300 | 420 | 640 | 43 | 18.6 |
| 30 | | 1,830 | 2,764 | 1,730 | 130 | 18.6 |

Total rate of heat recovery: 4,750,000 B.t.u./hr.

TABLE II.—PRIOR ART HEAT RECOVERY (WITHOUT PRIOR SEPARATION OF EXCESS AMMONIA)

| Stream No. | Steam composition kg./hr. | | | | Temp., °C. | Pressure, kg./sq. cm. |
|---|---|---|---|---|---|---|
| | Urea | Carbon dioxide | Ammonia | Water | | |
| 25 | 6,400 | 320 | 800 | 3,200 | 100 | 2.1 |
| 34 | 6,400 | 100 | 220 | 2,740 | 112 | 2.1 |
| 33 | | 220 | 580 | 460 | 112 | 2.1 |
| 19 plus 11 | 1,872 | 6,374 | 1,420 | 150 | 18.6 |
| 27 | | 300 | 420 | 640 | 43 | 18.6 |
| 30 | | 2,172 | 6,794 | 2,060 | 122 | 18.6 |

Total rate of heat recovery: 2,845,000 B.t.u./hr.

Comparing the results of Tables I and II, it is apparent that practice of the present invention as illustrated in Table I results in significantly greater heat recovery. In addition, the final aqueous urea product stream 34 in Table I contains substantially less residual carbon dioxide, ammonia and water vapor than the corresponding aqueous urea product stream 34 in Table II. Significantly higher temperature levels are attained for streams 34, 33 and 30 in Table I as compared to Table II.

I claim:
1. In a urea synthesis process in which recycled aqueous ammonium carbamate solution, ammonia and carbon dioxide are reacted at elevated pressure and in a molar ammonia to carbon dioxide ratio greater than 2 to 1 to form urea and produce a liquid synthesis effluent stream containing urea, unconverted ammonium carbamate, excess ammonia and water, the pressure of said synthesis effluent stream is reduced, said synthesis effluent stream is heated to decompose ammonium carbamate and generate a first off-gas containing ammonia and carbon dioxide ammonia and carbon dioxide, said first off-gas is separated from the residual liquid process stream, the pressure of said residual liquid process stream is reduced, said residual liquid process stream is heated in a heat exchange zone to decompose residual ammonium carbamate and generate a second off-gas containing ammonia and carbon dioxide, and said second off-gas is separated from the residual liquid process stream comprising product aqueous urea solution, the improvement which comprises
(a) reducing the pressure of said synthesis effluent stream under substantially adiabatic conditions, whereby ammonium carbamate is decomposed and a third off-gas is generated which principally comprises ammonia and contains a major portion of said excess ammonia together with ammonia and carbon dioxide derived from ammonium carbamate decomposition,
(b) separating said third off-gas from the liquid synthesis effluent stream, prior to heating said synthesis effluent stream and generating said first off-gas, whereby said first off-gas contains a substantially lower proportion of ammonia than said third off-gas,
(c) reacting said first off-gas with an aqueous absorbent solution while in heat exchange with said residual liquid process stream in said heat exchange zone, whereby at least a portion of said first off-gas is absorbed into said aqueous absorbent solution and heat is thereby liberated at an elevated temperature,
(d) combining said third off-gas with the cooled mixture of first off-gas and aqueous absorbent solution discharged from said heat exchange zone,
(e) scrubbing the gas phase of the combined stream formed by step (d) with cold aqueous ammonium carbamate solution, whereby a major portion of the carbon dioxide content of said gas phase is dissolved into said solution and said solution is heated,
(f) cooling and refluxing the residual gas phase from step (e) to produce a final gas phase comprising ammonia substantially free of carbon dioxide,
(g) recycling said final gas phase to urea synthesis,
(h) adding the liquid phase of said combined process stream formed by step (d) to said heated aqueous ammonium carbamate solution produced by step (e), to form a combined ammonium carbamate solution,
(i) recycling a portion of said combined ammonium carbamate solution to urea synthesis as said recycled aqueous ammonium carbamate solution, and
(j) cooling and recycling the balance of said combined ammonium carbamate solution as said cold aqueous ammonium carbamate solution of step (e).

2. The process of claim 1, in which said second off-gas is scrubbed with a cold aqueous solution to absorb and recover ammonia from said second off-gas, a portion of the resulting solution is cooled and recycled for further scrubbing, and the balance of said resulting solution is passed to said heat exchange zone as said aqueous absorbent solution for reaction with said first off-gas.

3. The process of claim 1, in which said reaction of recycled aqueous ammonium carbamate solution, ammonia and carbon dioxide to form urea and produce said synthesis effluent stream is carried out at a pressure in the range of 140 kg./sq.cm. to 420 kg./sq.cm. and a temperature in the range of 150° C. to 230° C., said third off-gas is generated from said synthesis effluent stream at a pressure in the range of 14 kg./sq.cm. to 30 kg./sq.cm. and a temperature in the range of 100° C. to 150° C., said liquid synthesis effluent stream is heated at a pressure in the range of 14 kg./sq.cm. to 30 kg./sq.cm. and a temperature in the range of 120° C. to 180° C. to generate said first off-gas, and the residual liquid process stream is heated in said heat exchange zone at a pressure in the range of 1.4 kg./sq.cm. to 4.5 kg./sq.cm. and a temperature in the range of 100° C. to 150° C. to generate said second off-gas.

References Cited

UNITED STATES PATENTS

| 3,354,205 | 11/1967 | Marten | 260—555 |
| 3,193,353 | 6/1965 | Matile et al. | 260—555 |
| 3,172,911 | 3/1965 | Mavrovic | 260—555 |
| 3,090,811 | 5/1963 | Otsuka et al. | 260—555 |

LEON ZITVER, Primary Examiner

M. W. GLYNN, Assistant Examiner